United States Patent [19]

Priestley et al.

[11] Patent Number: 4,981,593
[45] Date of Patent: Jan. 1, 1991

[54] SEWAGE TREATMENT

[75] Inventors: Anthony J. Priestley, Elsternwick; Mark A. Woods, Mulgrave, both of Australia

[73] Assignee: Commonwealth Scientific and Industrial Research Organisation, Campbell, Australia

[21] Appl. No.: 332,457

[22] PCT Filed: Sep. 15, 1987

[86] PCT No.: PCT/AU87/00314

§ 371 Date: Mar. 6, 1989

§ 102(e) Date: Mar. 6, 1989

[87] PCT Pub. No.: WO88/01985

PCT Pub. Date: Mar. 24, 1988

[30] Foreign Application Priority Data

Sep. 16, 1986 [AU] Australia ............... PH8044

[51] Int. Cl.$^5$ .............. C02F 1/28; C02F 3/28
[52] U.S. Cl. .................... 210/613; 210/618; 210/631; 210/670; 210/695; 210/713
[58] Field of Search ............ 210/605, 609, 612, 613, 210/615-618, 630, 631, 670, 675, 676, 691, 692, 694, 695, 710-715, 768, 807, 908

[56] References Cited

U.S. PATENT DOCUMENTS

| 3,658,697 | 4/1972 | Huether | 210/617 |
| 3,928,191 | 12/1975 | Belasco | 210/616 X |
| 4,053,394 | 10/1977 | Fisk | 210/609 |
| 4,076,615 | 2/1978 | Olesen et al. | 210/616 |
| 4,200,524 | 4/1980 | Levin | 210/616 |
| 4,253,966 | 3/1981 | Lebesque et al. | 210/617 |
| 4,315,823 | 2/1982 | Witt et al. | 210/631 X |
| 4,576,718 | 3/1986 | Reischl et al. | 210/616 |
| 4,609,469 | 9/1986 | Keoteklian | 210/609 |
| 4,626,354 | 12/1986 | Hoffman et al. | 210/616 |
| 4,735,725 | 4/1988 | Reischl et al. | 210/616 |

FOREIGN PATENT DOCUMENTS

24736/77 11/1978 Australia .
40032/78 3/1980 Australia .
73651/81 11/1981 Australia .

Primary Examiner—Tom Wyse
Attorney, Agent, or Firm—Cushman, Darby & Cushman

[57] ABSTRACT

The sewage treatment process combines physico-chemical clarification using fine material or clay particles with anaerobic digestion of a concentrated sewage. The particles are preferably magnetite. The sewage (10) is mixed with magnetite (12) having a hydroxylated surface layer in tanks (14, 16, 18, 20) in which acid, inorganic flocculant and polyelectrolyte may be added if necessary. The organic material in the sewage is adsorbed on the particles during the mixing contact and a clarified liquid effluent (28) is separated from the loaded particles in a clarifier (22). The organic material may be separated from the particles before or after treatment in an anaerobic digestion assembly (36). The particles are preferably cleansed and regenerated in a two stage countercurrent flow washing system (38, 40, 58, 60, 62) into which a dilute solution of caustic soda or lime (32) is introduced.

17 Claims, 5 Drawing Sheets

SEWAGE TREATMENT

This invention relates to a new process for sewage treatment. The process of the invention combines physico-chemical clarification using fine mineral or clay particles with anaerobic digestion of a concentrated sewage.

Sewage can be regarded as the water-borne waste products of man. Ever since man has gathered himself into large communities, the effective treatment and disposal of sewage has been a matter for concern. Initially, the problem was solved by discharge into tidal waters or an inland watercourse. However, with an increase in population density, this option became unworkable and some form of treatment became necessary.

The main aim of sewage treatment is to greatly reduce both the biological oxygen demand (BOD) of the sewage and the number of pathogenic organisms. Recently, the removal of inorganic nutrients (phosphorus and nitrogen) has also become important. Historically, both clarification in settling tanks and biological oxidation have been used. Biological oxidation can be achieved in lagoons, trickling filters or activated sludge plants, the particular process chosen depending on such factors as land availability, sewage strength and power costs. In an industrialized economy, the activated sludge process is usually selected because of smaller land requirements and the relative cheapness of power.

Up to date capital and operating costs for an activated sludge plant are difficult to obtain, but some idea of costs can be gained by taking historical costs and updating to the present. Analysis of cost information for the years 1968 to 1977 shows that, when indexed to 1986, a direct operating cost of approx. 10¢/m$^3$ is obtained, while the capital cost of a 38 ML/day plant is estimated to be A\$16×10$^6$. Amortization of capital cost over 25 years at 15% p.a. results in a contribution to total treatment cost of approx. 20¢/m$^3$. Total treatment cost of the sewage is thus of the order of 30¢/m$^3$.

With industrialization, sewage flows and, as a consequence, total costs have increased dramatically. While a large fraction of these costs can be attributed to the collection system (drains, sewers etc.), treatment costs are still a significant fraction of the total, especially when more stringent effluent standards are enforced. As a consequence, there is considerable incentive to reduce treatment costs, and recent efforts to apply anaerobic techniques to sewage treatment have had this aim.

The invention seeks to provide a process for the treatment of domestic sewage, which will significantly reduce total treatment costs. While conventional processes generally rely on aerobic biological oxidation, this process proposes to use a combination of efficient physico-chemical clarification with rapid anaerobic biological digestion. The reduction in treatment costs can be achieved by greatly reducing capital costs, while limiting operating costs to below those for the conventional process. As capital costs represent about two thirds of the total treatment cost, a significant cost reduction should result.

The first stage of the present process involves physico-chemical clarification of raw sewage or primary settled sewage. This part of the process derives from the so-called "Sirofloc" process for water clarification, various aspects of which are described in Australian Patents Nos. 512,553, 518,159 and 550,702, the full texts of which are hereby incorporated into the present specification. Basically, the Sirofloc process provides rapid and efficient removal of suspended impurities and coloured substances (turbidity and colour colloids) from water by treatment of the water with a finely divided particulate mineral or clay material (referred to as a "coagulant/adsorbent") the individual particles of which have a particle size of 10 microns or less and have a thin hydroxylated surface layer. A positive zeta potential on the surface of the coagulant/adsorbent particles is not considered necessary for the present process.

Operation of the Sirofloc process is often enhanced by the addition to the water under treatment of a suitable coagulant, such as alum or ferric chloride, and/or a polyelectrolyte (cationic, anionic or non-ionic). The preferred coagulant-adsorbent in the process is magnetite. Apart from the ease with which the required hydroxylated surface layer can be formed (and regenerated) on magnetite, the magnetic properties of the mineral can be usefully employed to aid in separation of the coagulant/adsorbent from the treated water.

We have found that there is a strong tendency for sewage organics to co-flocculate with coagulant/adsorbents such as magnetite. The rapid adsorption and flocculation with such materials contrasts strongly with the long contact times and slow clarification of the activated sludge process.

We have also found surprisingly, that the coagulant/adsorbents can adsorb a significant fraction of the soluble chemical oxygen demand (COD) present in sewage as well as removing suspended and colloidal material. The ability of the coagulant/adsorbents, and particularly magnetite, to remove soluble organic material is contrary to expectations from the studies that have been made of the Sirofloc process, and it enables a high degree of clarification of the sewage to be achieved.

Anaerobic digestion of concentrated sewage sludges has long been practised as a means of stabilizing the sludge prior to disposal, and in recent years there has been a strong resurgence of interest in the anaerobic treatment process. However, although raw sewage can be treated by anaerobic digestion the quality of the treated sewage is frequently unacceptable. The anaerobic digestion of raw sewage at ambient temperature is slow, especially in cold climates where the process may be inoperable. Moreover, the large volume of dilute material to be treated generally makes it impractical or uneconomic to carry out anaerobic digestion of raw sewage at elevated temperatures in order to accelerate the digestion and reduce the residence time required. For example, insufficient methane is produced in the anaerobic fermentation of raw sewage to serve as fuel for heating the large volume of dilute material, and the use of supplementary fuels is generally prohibitively expense.

The present invention overcomes these limitations by employing physicochemical clarification to provide an effluent of high quality while simultaneously concentrating the organic material in the sewage into a sludge suitable for rapid anaerobic digestion.

According to the present invention, there is provided a sewage treatment process which comprises the steps of:

(a) mixing raw sewage or primary settled sewage with a coagulant/adsorbent which is a finely divided particulate mineral or clay material the individual particles of which have a thin hydroxylated surface layer, under conditions whereby at least a substantial proportion of the organic material in the sewage becomes attached to the coagulant/adsorbent;
separating the coagulant/adsorbent with attached organic material from the mixture to leave a treated liquid effluent; and
(c) subjecting the thus separated organic material to anaerobic digestion.

As will appear from the following discussion, step (c) may be carried out while the organic material is still attached to the coagulant/adsorbent; or preferably, the organic material may be removed from the coagulant/adsorbent before anaerobic digestion.

The anaerobic digestion may be performed in any known type of digester suitable for mesophilic or thermophilic digestion.

The coagulant/adsorbents which may be used in accordance with the present invention may be of two notionally different types, i.e.: (I) those in which the hydroxylated layer is derived directly from the substance of the particles; and (II) those in which the layer is derived from another substance.

The preferred coagulant/adsorbent materials are those of type I and these can be derived from a wide variety of minerals and clays provided the nature of the mineral is such as to permit the ready formation of the hydroxylated surface. In this respect oxides and silicates are particularly useful. Examples of such minerals include zinc oxide, silica and siliceous materials such as sand and glass and clay minerals such as mica, china clay and pyrophillite. This list is not exhaustive, however, and many other minerals are suitable for use in this invention.

In the most preferred embodiment of this invention, the particulate material is a magnetic or magnetisable material. For this purpose iron oxides, such as gamma iron oxide or magnetite, which are eminently suitable, or ferrites, such as barium ferrite or spinel ferrite, can be used.

The coagulent/adsorbent particles should have a particle size of 20 microns or less, preferably 1 to 10 microns. It is believed that the optimum size range for the preferred method of operating the process is 1 to 5 microns.

The preparation of finely divided coagulant/adsorbent particles of type I to give each a thin hydroxylated surface layer is easily carried out, usually by suspending the particles in a basic, preferably an alkali, solution for a short period of time, preferably in the presence of air. Sodium hydroxide is suitable, but potassium hydroxide, lime or aqueous ammonia may also be used. Generally, alkali concentrations should be at least 0.01N, preferably about 0.05N to 0.1N, at which level the treatment is effective after about 10 minutes. Shorter treatment times can be achieved by the use of elevated temperatures and/or higher alkali concentrations. A suggested temperature range is 40°-60° C. For example, a satisfactory material is produced using either 0.1N sodium hydroxide at room temperature (i.e. about 20° C.) for ten minutes, or 0.05N sodium hydroxide solution at about 60° C. for five minutes.

Because the hydroxylated layer of the type II coagulant/adsorbent is provided by a different substance, to the material of the mineral or clay particle the range of starting materials is broader. A wide variety of minerals and clays can be used provided the nature of the mineral or clay is such as to permit the ready deposition of a hydroxide gel on its surface. In this respect oxides, sulphates, silicates and carbonates are particularly useful. Examples of such minerals include calcium sulphate, calcium carbonate, zinc oxide, barium sulphate, silica and siliceous materials such as sand and glass and clay minerals such as mica, china clay and pyrophillite. This list is not exhaustive, however, and many other minerals are suitable for use in this invention. In some cases, pre-treatment of the surface of the mineral may be required to produce a satisfactory deposition of the hydroxide layer. Yet another alternative is to use hollow microspheres, e.g. of glass for the production of gel particles which can be separated from the liquid effluent, after the adsorbtion of the organic material in step (a), by flotation rather than sedimentation.

The hydroxylated layer of the coagulant/adsorbent particles of type II can be provided by any of a number of metal hydroxides, the requirements being substantial insolubility in water and a valency preferably of three or more.

Suitable metals with this characteristic are ferric iron, aluminium, zirconium and thorium. Ferric hydroxide is preferred because it is cheap, and exceptionally insoluble, over a wide pH range. For example, it does not readily dissolve at high pH, as does aluminium hydroxide.

The preparation of the coated particle of type II is also easily carried out, usually by suspending the particles in water, adding a salt of a suitable metal followed by an alkaline material, preferably in aqueous solution which will precipitate the metal hydroxide which then forms a coating on the particle. Typically, chlorides, sulphates, nitrates or other mineral acid salts of the metals are suitable; ferric chloride or aluminium sulphate are examples. The alkaline material may be sodium hydroxide, calcium hydroxide, ammonia or similar soluble material. The concentration and temperature at which the preparation is carried out is generally not critical.

In the case where magnetite or other iron oxide materials are used as the basis for type II particles, the metal salt which is employed to produce the hydroxide layer may be obtained by first adding acid to the suspension of the particles (to give ferric and/or ferrous salts in solution from the iron oxide) and then adding the alkaline material.

It has been found advantageous, when forming the particles of type II to provide means for increasing the degree of polymerization of the hydroxide layer. Polymerization occurs due to elimination of water and the establishment of oxygen ("ol") linkages between the metal atoms:

2MOH≶MOM+H$_2$O

This process occurs on standing, but can be accelerated by heating.

After preparation, it is best if the coated particles are not permitted to dry out. This can be avoided by keeping them under water. The thickness of the hydroxylated layer on the particles is not important since the flocculation or coagulation is a surface effect.

An important advantage of the process of the present invention is that the coagulant/adsorbent particles can be recycled many times. To achieve this, the adsorbed material is removed by raising the pH of a suspension of the adsorbent in water. In the case of type I coagulant/adsorbents, the coagulating properties may be regenerated by treatment with alkali solution; these two treatments may be combined.

As in the Sirofloc process the process of the present invention may be enchanced by the addition to the liquid under treatment of a suitable coagulant, such as polyelectrolyte (cationic, anionic or non-ionic) and/or an inorganic coagulant which provides multi-valent cations such as $Fe^{2+}$ (e.g. ferrous sulphate). More usually the multi-valent cations will have a valency of three or more, such as $Fe^{3+}$ or $Al^{3+}$, (e.g. from alum or ferric chloride). These coagulants are not essential but when both types (i.e. polyelectrolytes and the inorganic coagulants) are present they complement each other. The polyelectrolyte may be present in the range 0 to 10 mg/L, preferably from 2 to 5 mg/L. The inorganic coagulant may be present in the range 0 to 100 mg/L, preferably 20 to 50 mg/L.

The preferred coagulant/adsorbent is magnetite and the following detailed description will refer to that material. It will be appreciated however, that reference to magnetite includes mutatis mutandis reference to other coagulant/adsorbents.

Reference will now be made to the accompanying drawings in which.

Figure 1:
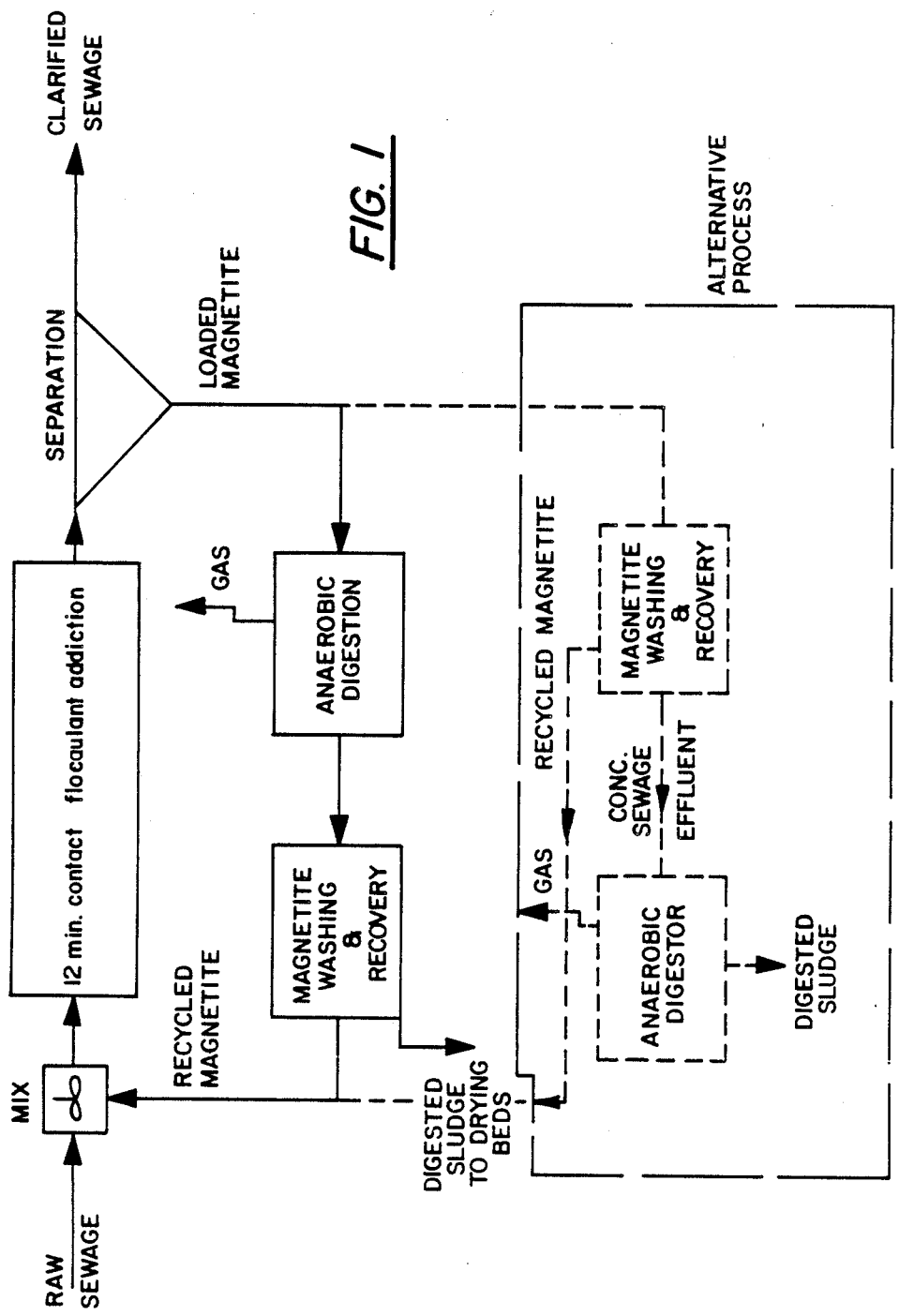
FIG. 1 is a flow diagram showing the process of the invention in its basic and alternative forms.

The basic process of the invention is shown by the solid connecting lines in FIG. 1.

Raw or primary settled sewage is mixed with finely-divided cleaned recycled magnetite particles which have been regenerated by suspension in a solution of caustic soda to produce a thin hydroxylated surface layer, and the mixture is stirred to provide good contact of sewage with the regenerated magnetite particles which are preferably in the size range 1 to 10 microns. The pH level may be adjusted by acid addition to be in the range 5 to 9, preferably 5.5 to 6.5 and the addition of an inorganic coagulant and/or a coagulant aid (e.g. a polyelectrolyte) may also be necessary to achieve a satisfactory effluent quality depending on the strength and composition of the raw sewage. After 2 to 20 minutes, preferably 10 to 15 minutes, of contact the magnetite slurry is separated from the treated effluent which may go to polishing ponds for final treatment before discharge. The magnetite particles, which now have attached to them most of the organic material originally present in the sewage, can be passed to an anaerobic digester where, because of the high concentration of organic material, rapid digestion at an elevated temperature of 35° to 40° C. may be achieved. Digestion may be performed at a temperature in the range of about ambient to about 70° C. but temperatures below about 30° C. result in insufficiently rapid digestion while temperatures between 40° C. and about 70° C. may speed up the process but would require additional heat. After exit from the digester, the magnetite may be cleaned by stripping of the digested sludge using a dilute solution of sodium hydroxide, ammonia, or potassium hydroxide or, for example, a lime slurry which also regenerates the magnetite. The magnetite can then be recycled while the stripped sludge is sent to drying beds for disposal.

A successful sewage treatment process based on the above procedure offers great scope for a reduction in capital cost as the residence time of the main sewage flow in the plant would be no longer than 30 minutes compared with approximately 8 hours for an activated sludge plant. The flow through the anaerobic digestion stage would be only about 1-2% of the main sewage flow and, assuming a high rate of digestion can be achieved, the size of the digester should be smaller than the sludge digester associated with a conventional activated sludge plant.

In the alternative, and more preferable process shown by the dashed lines in FIG. 1, the organic material is stripped from the magnetite before anaerobic digestion. The magnetite is recovered, regenerated and recycled as before.

Various aspects of the process of the invention are further described and discussed hereinafter. This material should not be construed as limiting on the nature or scope of the invention.

CLARIFICATION

There is a variety of parameters which can affect the efficiency of the clarification process. However, once the mixing and settling conditions have been prescribed, it is the addition of chemicals (including the fine hydroxylated magnetite particles) which controls the effluent quality. The preferred dose of hydroxylated magnetite on a dry weight basis is in the range 5 to 40 g/L of sewage. Jar tests were used for a preliminary study of the clarification process, and a sample of results is given in Table 1. It was possible to obtain a high quality effluent, similar to that from an activated sludge plant, simply by increasing the dose of chemicals; e.g. at a chemical cost of 10¢/m³ an effluent with a BOD of 25 mg/L and suspended solids of less than 1 mg/L was achieved, while at a more reasonable chemical cost of 5¢/m³ effluent BOD and suspended solids levels were 38 and 3.4 mg/L respectively. The removal levels of COD in Table 1 vary from 70 to 90% and compare favourably with those reported for a full anaerobic treatment of raw sewage.

TABLE 1

Clarification of Raw Sewage with Fine Magnetite Particles
Raw sewage characteristics"
SS 78 mg/L
COD 500 mg/L
BOD 220 mg/L

|  |  | Treated Sewage | | |
| --- | --- | --- | --- | --- |
| Treatment Conditions | Chemical Cost | Suspended Solids (mg/L) | Quality COD (mg/L) | BOD (mg/L) |
| 1. $FeCl_3$ - 20 mg/L<br>Polyelectrolyte - 4 mg/L<br>Acid - 0.5 mmol/L<br>Magnetite - 10 g/L | 4¢/m³ | 8 | 150 | 43 |

TABLE 1-continued

Clarification of Raw Sewage with Fine Magnetite Particles
Raw sewage characteristics"
SS 78 mg/L
COD 500 mg/L
BOD 220 mg/L

| Treatment Conditions | Chemical Cost | Treated Sewage Suspended Solids (mg/L) | Quality COD (mg/L) | BOD (mg/L) |
|---|---|---|---|---|
| 2. FeCl$_3$ - 20 mg/L<br>Polyelectrolyte - 4 mg/L<br>Acid - 1 mmol/L<br>Magnetite - 20 g/L | 5¢/m$^3$ | 3.4 | 120 | 38 |
| 3. FeCl$_3$ - 50 mg/L<br>Polyelectrolyte - 5 mg/L<br>Acid - 1 mmol/L<br>Magnetite - 10 g/L | 10¢/m$^3$ | 0.9 | 44 | 25 |

ANAEROBIC DIGESTION

The principal advantage of the present process, lies in the ability to achieve concentration of the organic material in raw sewage to a level that allows the organic material to be rapidly digested anaerobically. This concentrated material can be fed to the digester either attached to the magnetite particles used in clarification or as a concentrated slurry after stripping and separation from the magnetite particles. In either case the material is concentrated by a factor of about 60 over the raw sewage. Measured COD levels on a stripped slurry average around 30,000 mg/L, an ideal level for feeding to a mesophilic or thermophilic anaerobic digester. Anaerobic digestion of concentrated wastes is now a commercially successful process with a variety of digester designs being available.

DIGESTER OPERATION

In initial investigations of anaerobic digestion the concentrated magnetite slurry as separated from the liquid effluent was used as the feed material. In this situation the sewage material remains attached to the fine magnetite particles having a particle size in the range 1 to 10 microns, and it was hoped that in the digester these particles would be rapidly colonized by anaerobic bacteria, ensuring close proximity of food and microorganisms. The magnetite slurry had a water content of about 90% v/v (sp.gr. 1.4).

However, the results from four weeks of digester operation at pH 7 and a temperature of 35° C., with seed material from a conventional anaerobic sludge digester, were disappointing. At a feed rate of 5 kg COD/m$^3$d, gas analyses appeared satisfactory, the process taking about 2 weeks to reach a steady state with methane and carbon dioxide reaching 55 and 25% respectively on a w/w basis. Hydrogen concentrations reached undetectable levels after 2 weeks of operation. However, gas production rates were about 0.12 m$^3$/m$^3$d, an order of magnitude below what would be expected from a high rate digester, and showed no signs of increasing. A variety of reasons can be put forward to explain this poor result. The anaerobic bacteria may have been unable to attach themselves to the fine magnetite particles (1-10 mm), which are of a comparable size. As a consequence, access to their food supply may have been limited and this might have been alleviated by increasing the maximum particle size to 20 mm. Possible nutrient deficiencies, especially in phosphate which can be adsorbed by the magnetite particles, could also have caused or contributed to the poor result. The limited residence time of the magnetite particles in the digester may not have allowed sufficient bacterial colonization to occur.

Whatever the reason for the failure of the initial approach, improved digestion can be achieved by the alternative procedure of stripping and separating the concentrated sewage material from the magnetite particles and then feeding the resultant slurry to an anaerobic digester. The regenerated magnetite particles can then be directly recycled for a further clarification step.

In this approach, the anaerobic digester advantageously, but not essentially, contains larger magnetite particles, for example of size 50-100 mm to serve as the site for bacterial attachment and growth and these particles are permanently retained within the digester by recycle e.g. from an attached settling cone. The anaerobic digester could be of any other type suitable for mesophilic or thermophilic digestion but the presence of the larger magnetite particles is advantageous because they remove H$_2$S from the reactor environment.

Figure 2:
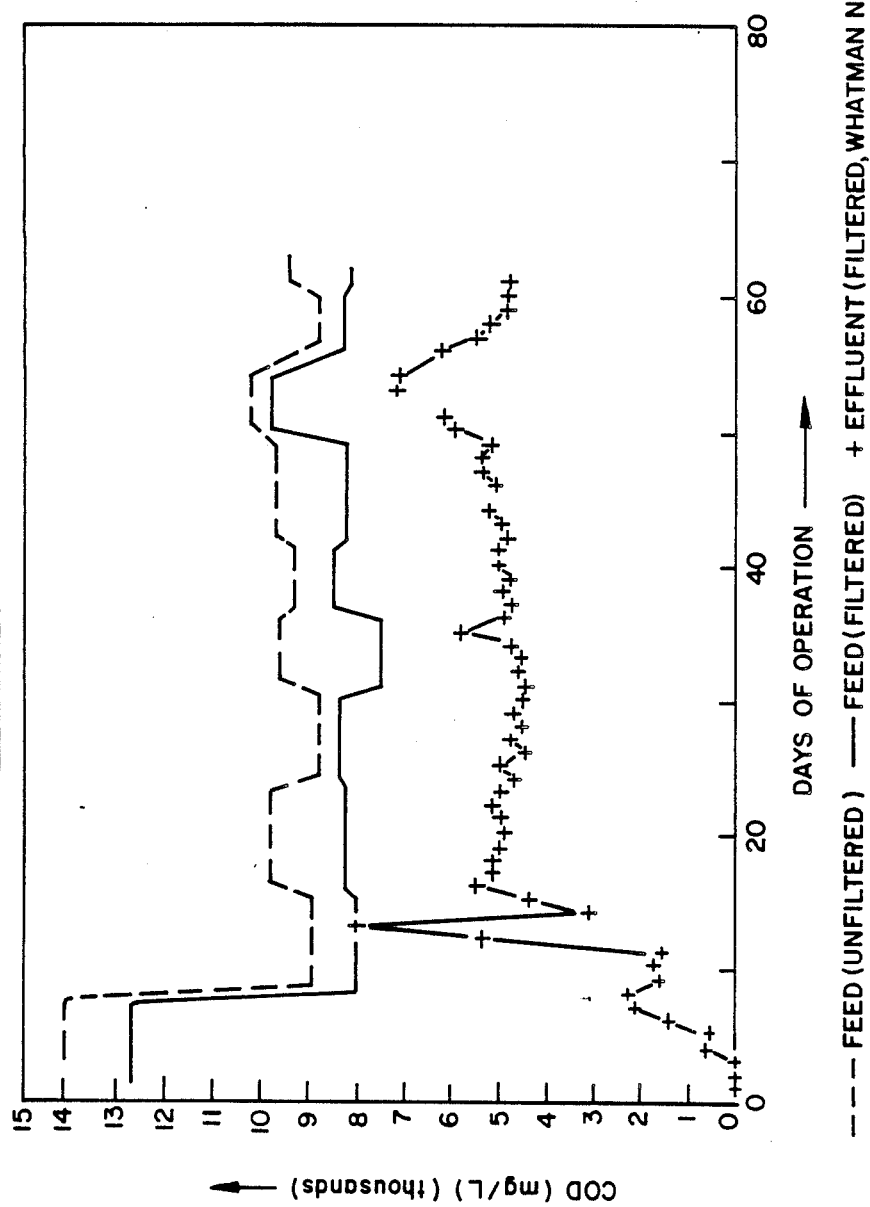
FIGS. 2 and 3 are graphs showing performance details of the process in its alternative form, as described in the following examples.
Figure 3:
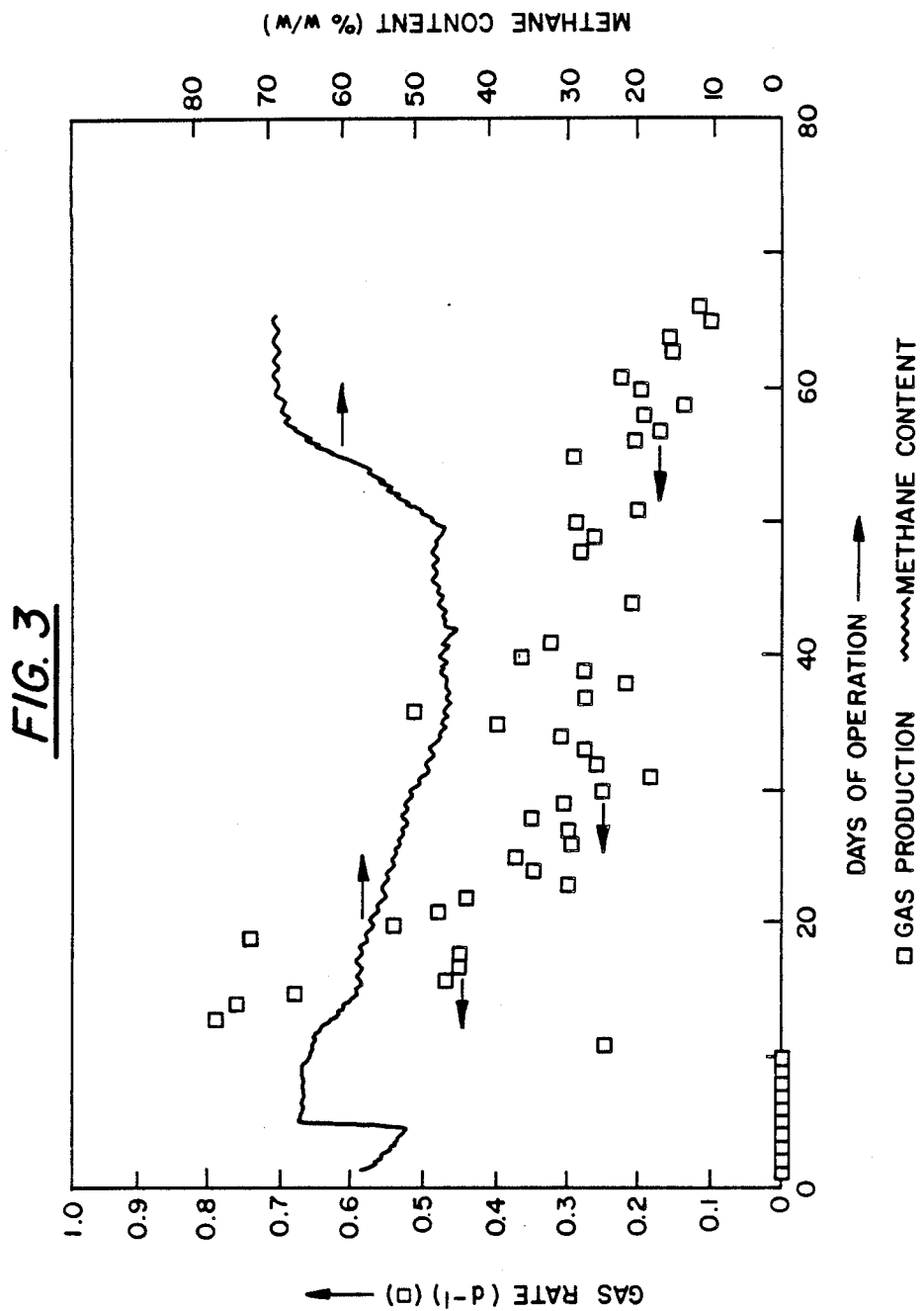

The results from the first sixty days of operation of such a digester, with a concentrated regeneration effluent as feed, are given in FIGS. 2 and 3. For the first week the COD of the feed was around 14,000 mg/L, but this level was lowered to between 9 and 10,000 mg/L after the first week by the addition of a more dilute washing effluent. Nominal liquid residence time was 2.5 days. The digester was seeded from material supplied by Bunge Pty. Ltd. During the first ten days of operation between 80 and 100% removal of COD was obtained, with an initial gas evolution rate of 0.4 m$^3$/m$^3$.d and a methane content of around 50%. Unfortunately, during the first week an undetected blockage in the gas sampling line prevented further measurements of gas rates during this period. However, it is probable that the high COD removal rates observed during this period were the result of a combination of physical adsorption and microbiological digestion. After day 10, although gas evolution rates of up to 0.8 m$^3$/m$^3$.d were initially observed, COD removal fell to about 40% and remained at this level for the duration of the operation. Gas evolution rates slowly declined although methane content never fell below 50% and increased up to 70% after day 50.

Figure 4:
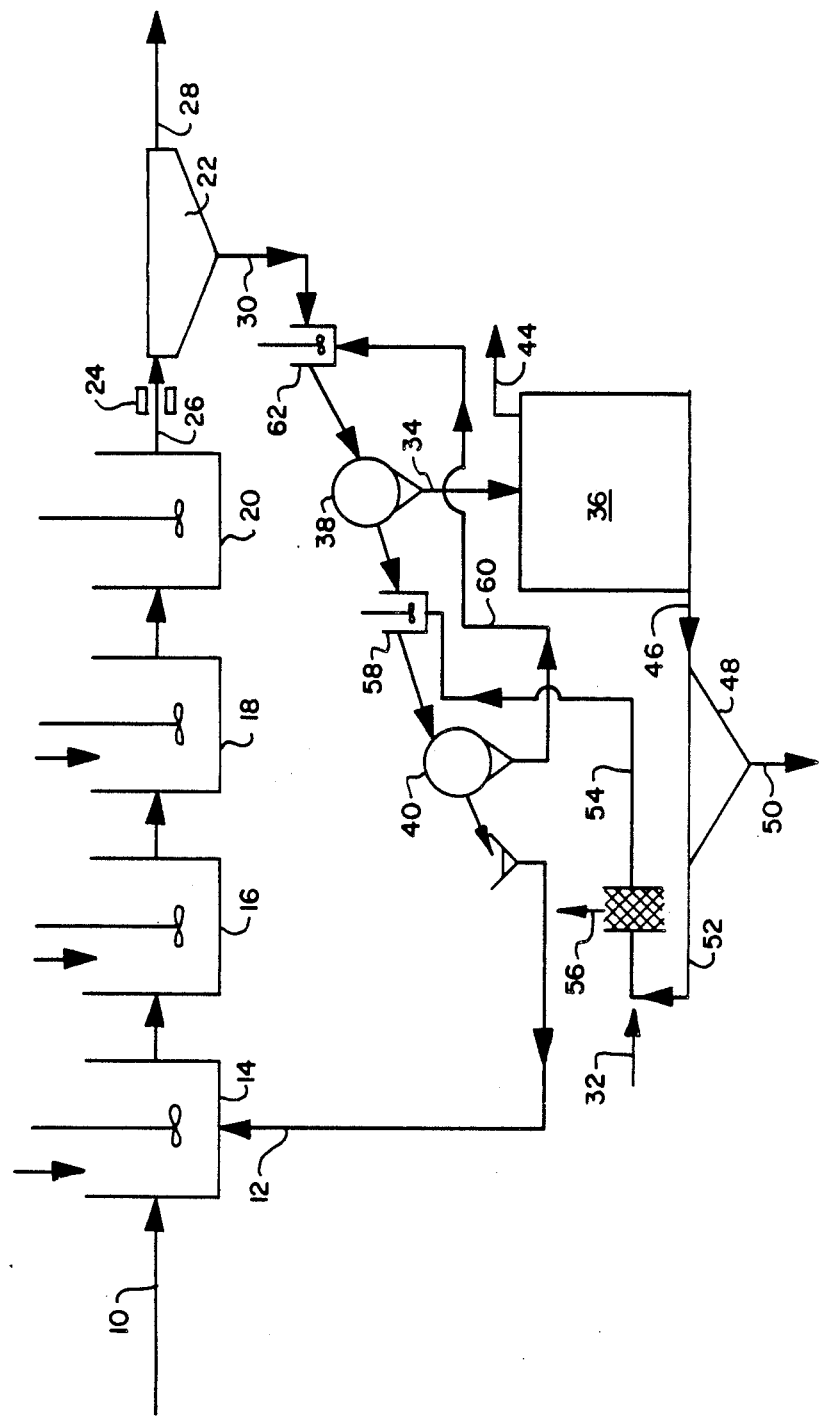
FIG. 4 is a detailed flow diagram of a preferred embodiment of the process of the invention.

FIG. 4 is a process flow diagram of the presently preferred overall process which essentially follows the alternative process of FIG. 1. The raw sewage at 10 is mixed with cleaned, recycled and regenerated magnetite particles at 12 at a rate of 5 to 40 grams dry weight per litre of raw sewage (preferably 10 to 20 g/L) and the aqueous mixture is stirred to provide good conatct between the sewage and the hydroxylated magnetite particles. This stirred contact can be achieved over a period of 2 to 20 minutes, preferably 10 to 15 minutes, in a series of four stirred tanks 14, 16, 18 and 20 as shown with acid being added in tank 14 to adjust the pH to within the range 5 to 9, preferably 5.5 to 6.5, inorganic flocculant such as alum being added in tank 16 and polyelectrolyte being added in tank 18. The quantities of the latter two components added will depend upon the quality of the treated sewage required as well as the strength and composition of the raw sewage but these two components may not be required at all. After the final mixing tank 18 the sewage/magnetite mix passes to a clarifier 22 on the way to which the magnetite is magnetized by a flocculating magnet 24, which is placed around the entrance pipe 26 to the clarifier 22. The clarifier may be of any suitable known type, but advantageously incorporates the improvement described in our Australian Patent specification No. 553,423 the contents of which are incorporated herein by reference. In the clarifier the loaded magnetite particles rapidly separate from the clarified sewage and this liquid effluent is exhausted from the process at 28. The loaded magnetite particles are extracted from the clarifier 22 at 30 and must then be regenerated, for example, by mixing them with a dilute solution of caustic soda which is introduced to the system at 32. Alternatively a lime slurry may be added. This regeneration process can produce a liquid stream 34 of sewage concentrate with a chemical oxygen demand (C.O.D.) in the range 10,000–20,000 mg/L, which is in the ideal range for feeding to a mesophilic anaerobic digester assembly 36.

As shown in FIG. 4 the preferred regeneration process involves a two stage countercurrent flow washing operation, which uses magnetic drum separators 38 and 40, which may be of known type, to separate the magnetite particles from recycled wash water in the two stages. The liquid effluent 42 from the first magnetic drum separator 38 passes to the anaerobic digester assembly 36, where the sewage organics are broken down to form methane which is exhausted at 44. The effluent 46 from the digester assembly 36 passes to a sludge settling pond 48 where particulate biomass settles out and may be disposed of as a dried sludge at 50. The overflow 52 from the pond 48 is relatively clear and colourless and has been found to have C.O.D. of less than 20% of that of the feed to the anaerobic digester assembly. Experiments have shown that this liquid overflow is suitable for recycling as the wash water 54. The caustic soda (NaOH) added to the waste water 54 at 32 raises the pH level to greater than 10 for regeneration of the magnetite and this also results in ammonia (which is generated in the anaerobic digester assembly 36) being stripped from the recycle stream by aeration at 56. This step alleviates the build up of ammonia in the wash water and thus allows the wash water to be recycled indefinitely. It will also prevent any ammonia, in excess of that coming in with the raw sewage, from finding its way into the clarified sewage effluent. Thus, the only liquid or solid effluents from the process will be the clarified sewage 28 and the dried anaerobically stabilised sludge 50.

Figure 5:
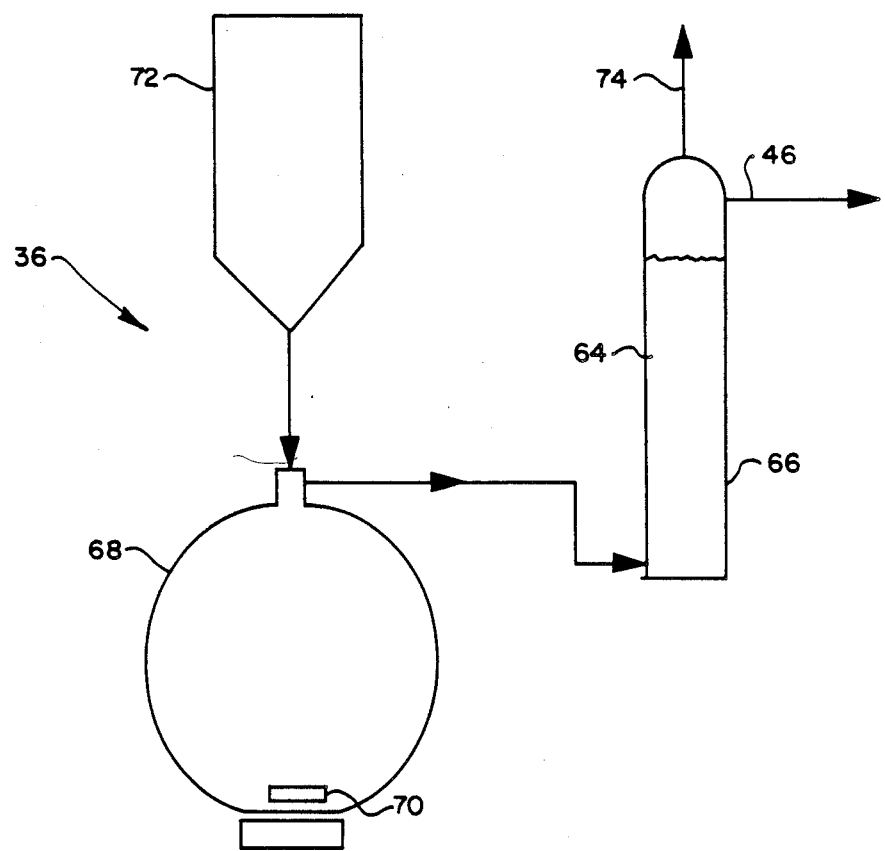
FIG. 5 illustrates a preferred anaerobic digester layout.

The recycled wash water 54 with ammonia removed is mixed with partly cleansed and regenerated magnetite in a stirring tank 58 in the magnetite flow line between the magnetic drum separators 38 and 40. The overflow from the tank 58 flows to the separator 40 where the fully cleansed and regenerated magnetite with hydroxide layer is extracted for recycle. The separator wash water is directed along flow line 60 into a stirring tank 62 in the magnetite flow line between the clarifier 22 and the magnetite drum separator 38. The recycle water and the loaded magnetite removed from the clarifier 22 are thoroughly mixed in the tank 62 and the overflow passes into the magnetic drum separator 38. As previously described the liquid effluent from the separator 38 passes to the anaerobic digester assembly 36 which may be as shown in FIG. 5.

The presently favoured technique for operation of the anaerobic digester assembly is to strip the sewage material from the magnetite particles with a dilute caustic soda solution to produce a sewage concentrate, which is then fed to an anaerobic digester assembly 36 as described above. To date, the best digester results have been obtained with an upflow anaerobic sludge blanket digester 64, operating at a laboratory scale in a 10 cm diameter glass column 66. This digester is preceded by a 5.5 L stirred pot 68, incorporating a magnetic stirrer 70, in which acidification of the sewage concentrate supplied from a feed tank 72 takes place at a pH of about 5.7. The anaerobic sludge blanket digester 64 was operated at a pH of about 7.2. The sewage concentrate had a pH level of about 10, but the acidification reactor 68 was still able to maintain its pH level with this feed. Some typical results of the digester operation are given in Table 2.

TABLE 2

| | C.O.D. mg/L | % removal of C.O.D. | Loading Rate g COD/g dry wt biomass · d | Hydraulic Retention Time |
|---|---|---|---|---|
| Feed | 6,800 | — | — | |
| Acidifiction Reactor | 5,850 (at exit) | 14% | 0.11 | 6.1 days |
| Anaerobic Sludge Blanket Digester | 1,200 (at exit) | 82% | 0.08 | 2.2 days |

Gas Production rate: 0.7 $m^3/m^3 \cdot d$
Table 1: Digester Operating Data

The results show a very good removal (82%) of C.O.D. through the digester system at quite reasonable loading rates. The effluent from the sludge blanket digester 64, after clarification in a settling pond (not shown), is sufficiently clear to allow the recycle and reuse of this material as wash water in the magnetite regeneration process as shown in FIG. 4. 75% of the gas given off at 24 from the digester was methane and 20% carbon dioxide.

The results obtained clearly demonstrate that the sewage concentrate obtained by stripping the magnetic particles can be rapidly digested anaerobically.

We claim:

1. A sewage treatment process characterized in that it comprises the steps of:
   (a) mixing raw sewage or primary settled sewage with a coagulant/adsorbent which is finely divided particulate mineral or clay material the individual particles of which have a thin hydroxylated surface layer, under conditions whereby at least a substantial proportion of the organic material in the sewage becomes attached to the coagulant/adsorbent;
   (b) separating the coagulant/adsorbent with attached organic material from the mixture to leave a treated liquid effluent; and (c) subjecting the thus separated organic material to anaerobic digestion.

2. A process according to claim 1 wherein the coagulant/adsorbent particles are of magnetite.

3. A process according to claim 1 wherein each coagulant/adsorbent particle has a particle size of 20 microns or less.

4. A process according to claim 1 wherein the coagulant/adsorbent particles are regenerated from a previous cycle of the process, to provide them with the thin hydroxylated surface layer.

5. A process according to claim 1 wherein the coagulant/adsorbent particles are added in an amount in the range of 5 to 40 grams dry weight per litre of sewage.

6. A process according to claim 1 wherein an additional inorganic coagulant providing multivalent cations is mixed with the sewage and coagulant/adsorbent in an amount of 0 to 100 mg/L of sewage.

7. A process according to claim 6 wherein the multivalent cations are selected from $Fe^{2+}$, $Fe^{3+}$ and/or $Al^{3+}$.

8. A process according to claim 1 wherein a polyelectrolyte is mixed with the sewage and coagulant/adsorbent in an amount of 0 to 10 mg/L of sewage.

9. A process according to claim 1 wherein the pH of the sewage and coagulant/adsorbent mixture is adjusted to in the range of 5 to 9.

10. A process according to claim 1 wherein the contact time for the sewage and coagulant/adsorbent mixture prior to step (b) is in the range 2 to 20 minutes.

11. A process according to claim 1 wherein the coagulant/adsorbent particles are of magnetic material and the particles are magnetised between steps (a) and (b).

12. A process according to claim 1 wherein the organic material is subjected to anaerobic digestion attached to the coagulant/adsorbent.

13. A process according to claim 1 wherein the organic material is separated from the coagulant/adsorbent prior to anaerobic digestion.

14. A process according to claim 13 wherein the coagulant/adsorbent particles are cleansed and regenerated by a two-stage separating and backwashing treatment in which the pH is increased to at least 10 and the organic material is separated from the particles in a first separator in the particle flow path.

15. A process according to claim 1 wherein the coagulant/adsorbent particles are separated from the organic material using a dilute solution of sodium hydroxide, potassium hydroxide or ammonia or using a lime slurry.

16. A process according to claim 1 wherein the anaerobic digestion is performed at a temperature in the range 30° to 40° C.

17. A process according to claim 1 wherein the anaerobic digestion is performed in an upflow anaerobic sludge blanket digester.

* * * * *